W. H. McLAUGHLIN.
CONNECTING DEVICE.
APPLICATION FILED JULY 3, 1917.
1,282,608.
Patented Oct. 22, 1918.
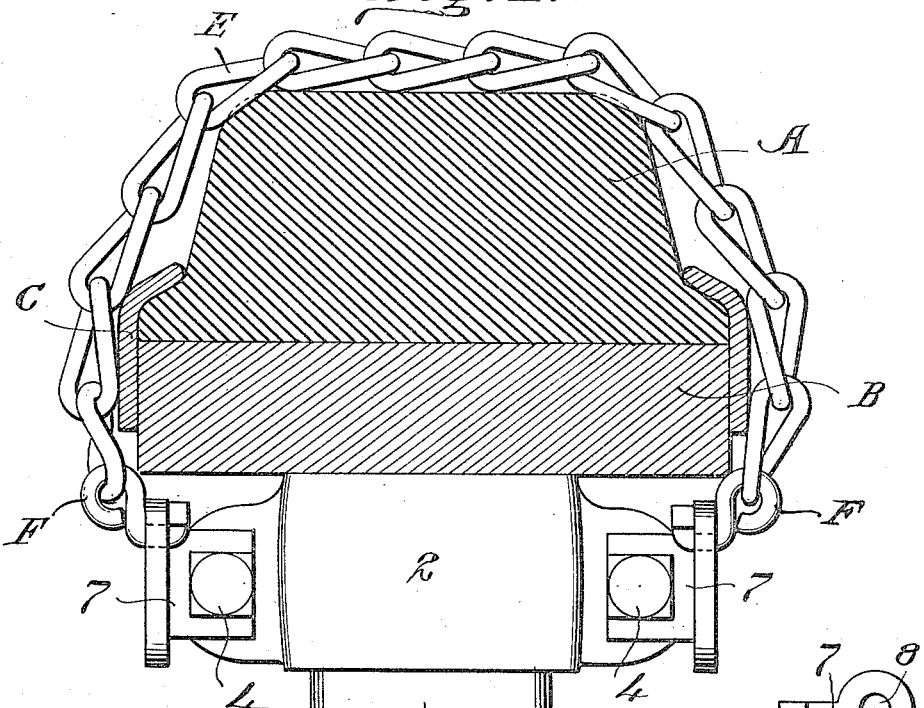
Fig. 1.
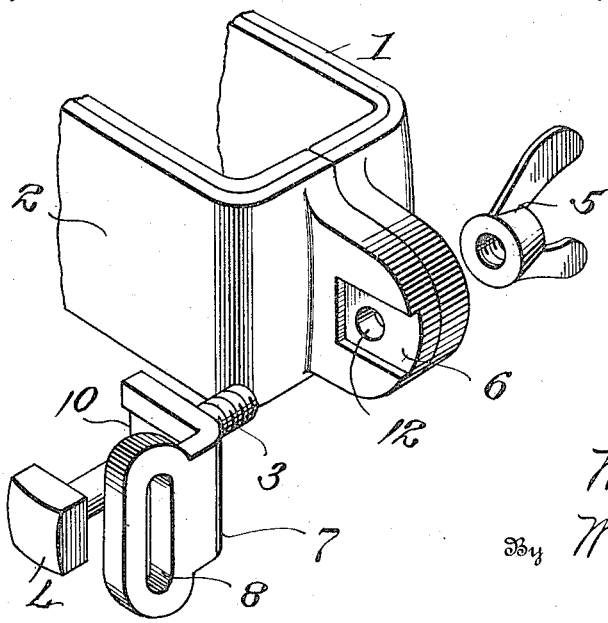
Fig. 2.
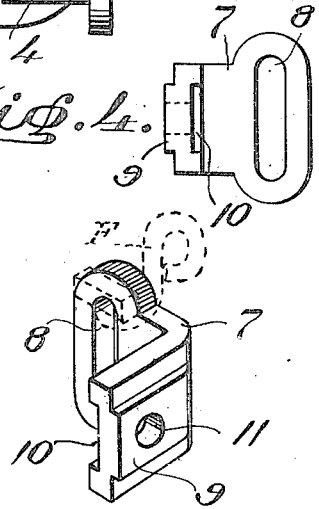
Fig. 4.
Fig. 3.
Inventor
W. H. McLaughlin
By W. H. Babcock & Son
Attorneys

UNITED STATES PATENT OFFICE.

WILLIAM H. McLAUGHLIN, OF HARTFORD, CONNECTICUT, ASSIGNOR TO CASSIUS S. CHASE, OF HARTFORD, CONNECTICUT.

CONNECTING DEVICE.

1,282,608.    Specification of Letters Patent.    Patented Oct. 22, 1918.

Application filed July 3, 1917. Serial No. 178,460.

*To all whom it may concern:*

Be it known that I, WILLIAM H. McLAUGHLIN, a citizen of the United States, residing at Hartford, in the county of Hartford and State of Connecticut, have invented certain new and useful Improvements in Connecting Devices, of which the following is a specification.

This invention relates to attachments intended more particularly to be used with anti-skidding chains for automobile trucks and has special reference to the means of securing said chains to the clamps. This will be the preferred and is the intended use for said attachments, though they may be used to advantage in a number of different arts.

The primary object of this invention is to provide an attachment which may be applied to a common well known form of clamp, so combining the parts as to provide, with this attachment, a clamp provided with eyes for the reception of a chain connector connecting the terminal links of the anti-skidding chain, above mentioned, thereto.

In the accompanying drawings:

Figure 1 represents a front elevation of a clamp embodying my invention, applied to the spoke of a truck wheel, the tire, rim and felly of which are shown in section;

Fig. 2, a perspective view of the parts separated;

Fig. 3, a detail perspective view of one of the attaching devices; and

Fig. 4, a side elevation of the same.

Referring now in detail to the drawings, A designates the usual solid cushion tire, B the felly, C the rim and D the spoke to which the clamp-plates 1 and 2 are secured by the bolts 3 having angular heads 4 and tightened up by means of wing nuts 5.

In casting the clamp plates, as well as other plates to be held in position by angularly headed fastening means it is quite common to provide an angular recess to receive the angular head of the fastening means to hold it against turning when the nut is applied or to prevent the plate from turning on said fastening.

In the accompanying drawings the plate 2 is shown provided in each of its end lugs with such a recess 6.

An angular piece or part, 7, having an eye 8 in one arm and having a flange 9 corresponding in width to the width of recess 6 and having its other face provided with a recess 10 and provided with a perforation 11 in assembled position registering with the bolt-hole 12 in the corresponding lug of the plate 2, is held firmly in such position with its flange 9 in recess 6 by said bolt 3 which is tightened up by the nut 5, as stated. The edges of the flange 9 engaging with the walls of recess 6 prevent the piece 7 from turning, under strain, on said bolt as a pivot, and the walls of recess 10 engaging with the side faces of head 4 prevent the bolt 3 from turning while the nut 5 is being tightened thereon, performing the same function as the walls of recess 6 were originally intended to perform.

Having thus described my invention, what I claim as new and desire to secure by Letters Patent is:

1. A supporting member having an angular recess, in combination with an attaching element adapted to be secured thereto, said attaching element having an eye to receive an additional element and a perforation to receive the securing means and provided with an angular flange surrounding said perforation and corresponding in shape and size to, and adapted to fit in, the recess of said supporting member, the other face of said attaching element being angularly recessed adjacent said perforation to partially receive the angular head of the securing means.

2. An attaching element adapted to be secured in the recess of a supporting element, said part having two arms, one arm being perforated to receive a bolt, having its lower face provided with a flange adapted to fit in the recess of said supporting element, which recess and flange are so formed as to prevent turning movement between said supporting element and said attaching element, said arm having its upper face provided with an angular recess surrounding said perforation and adapted to receive the angular head of the bolt to hold the latter against turning, and the other arm of said attaching element being provided with an eye to receive an additional element.

In testimony whereof, I have signed my name to this specification.

WILLIAM H. McLAUGHLIN.

Copies of this patent may be obtained for five cents each, by addressing the "Commissioner of Patents, Washington, D. C."